(12) United States Patent
Sim

(10) Patent No.: US 10,115,554 B2
(45) Date of Patent: Oct. 30, 2018

(54) FUSE CASE AND CASE COVER OF VACUUM CONTACTOR

(71) Applicant: LSIS CO., LTD., Anyang-si, Gyeonggi-do (KR)

(72) Inventor: Byeongsun Sim, Anyang-si (KR)

(73) Assignee: LSIS CO., LTD., Anyang-Si, Gyeonggi-Do (KR)

( * ) Notice: Subject to any disclaimer, the term of this patent is extended or adjusted under 35 U.S.C. 154(b) by 0 days.

(21) Appl. No.: 15/411,998

(22) Filed: Jan. 21, 2017

(65) Prior Publication Data

US 2017/0236672 A1 Aug. 17, 2017

(30) Foreign Application Priority Data

Feb. 12, 2016 (KR) .................. 20-2016-0000750 U

(51) Int. Cl.
*H01H 85/02* (2006.01)
*H01H 85/38* (2006.01)
(Continued)

(52) U.S. Cl.
CPC ........ *H01H 85/0241* (2013.01); *H01H 33/66* (2013.01); *H01H 85/38* (2013.01); *H02B 11/26* (2013.01)

(58) Field of Classification Search
CPC .. H01H 33/66; H01H 33/662; H01H 85/0241; H01H 85/0047; H01H 85/38;
(Continued)

(56) References Cited

U.S. PATENT DOCUMENTS 5,481,075 A 1/1996 Kleinecke et al.
6,624,996 B2 9/2003 Theaudiere et al.
(Continued)

FOREIGN PATENT DOCUMENTS

CN 101841134 A 9/2010
CN 202178522 U 3/2012
(Continued)

OTHER PUBLICATIONS

Korean Intellectual Property Office Application No. 20-2016-0000750, Search Report dated Apr. 22, 2016, 3 pages.
(Continued)

*Primary Examiner* — Anatoly Vortman
*Assistant Examiner* — Jacob Crum
(74) *Attorney, Agent, or Firm* — K&L Gates LLP

(57) ABSTRACT

A fuse case and a case cover of a vacuum contactor including a truck, a main circuit unit, and a front cover covering a front side of the main circuit unit include a fuse connected to an upper terminal of the main circuit unit and blowing, when a fault current is generated in a circuit, to break the circuit, a fuse case opened in an upper side, accommodating the fuse, and having an insertion coupling part formed on a side surface thereof, and a case cover coupled to an upper side of the fuse case, coupled to the insertion coupling part in an insertion coupling manner, and covering a rear end portion of the fuse, wherein the case cover includes an upper surface portion and side surface portions, and the side surface portions include a first side surface portion and a second side surface portion.

7 Claims, 7 Drawing Sheets

(51) Int. Cl.
*H01H 33/66* (2006.01)
*H02B 11/26* (2006.01)

(58) Field of Classification Search
CPC .... H01H 85/2045; H01H 85/22; H01H 85/25; H01H 2033/6623; H01H 2085/2075; H01H 2085/2085; H02B 1/18; H02B 11/26
USPC .............................................. 337/4
See application file for complete search history.

(56) References Cited

U.S. PATENT DOCUMENTS

| | | | | |
|---|---|---|---|---|
| 2001/0003069 | A1* | 6/2001 | Sekido | H01H 85/2045 439/76.2 |
| 2002/0134572 | A1* | 9/2002 | Matsumura | H01H 85/044 174/66 |
| 2010/0039789 | A1* | 2/2010 | Mason | H01H 85/20 361/833 |
| 2010/0236905 | A1* | 9/2010 | Capelli | H02B 11/127 200/50.24 |
| 2013/0043971 | A1* | 2/2013 | Chen | H01H 85/2045 337/205 |
| 2013/0164599 | A1* | 6/2013 | Kim | H01M 2/1077 429/158 |
| 2014/0162497 | A1* | 6/2014 | Lim | B60L 3/04 439/620.26 |
| 2015/0130584 | A1* | 5/2015 | Totsuka | H01H 85/12 337/186 |

FOREIGN PATENT DOCUMENTS

| | | |
|---|---|---|
| CN | 204180399 U | 2/2015 |
| CN | 104488060 A | 4/2015 |
| CN | 104754909 A | 7/2015 |
| DE | 1076775 | 3/1960 |
| EP | 2600377 | 6/2013 |
| JP | 2011103345 | 5/2011 |
| JP | 2015125931 | 7/2015 |
| KR | 2019920006962 | 4/1992 |
| KR | 1020110009901 | 1/2011 |
| KR | 101066902 | 9/2011 |
| KR | 200461249 | 6/2012 |
| KR | 200466275 | 4/2013 |
| KR | 2020150001243 | 3/2015 |
| KR | 20150089734 | 8/2015 |
| KR | 1020150089734 | 8/2015 |

OTHER PUBLICATIONS

European Patent Office Application Serial No. 16199448.8, Search Report dated Jun. 16, 2017, 8 pages.

Korean Intellectual Property Office Application No. 20-2016-0000750, Office Action dated Apr. 19, 2017, 5 pages.

Chinese Office Action for related Chinese Application No. 201710015066.1; action dated May 22, 2018; (7 pages).

\* cited by examiner

FUSE CASE AND CASE COVER OF VACUUM CONTACTOR

CROSS-REFERENCE TO RELATED APPLICATION

Pursuant to 35 U.S.C. § 119(a), this application claims the benefit of earlier filing date and right of priority to Korean Application No. 20-2016-0000750, filed on Feb. 12, 2016, the contents of which are all hereby incorporated by reference herein in its entirety.

BACKGROUND OF THE INVENTION

1. Field of the Invention

The present disclosure relates to a fuse case and a case cover of a vacuum contactor in which a case cover is provided in a cradle side terminal part of a fuse case, preventing dielectric breakdown, and a protrusion type locking device structure is employed to facilitate attachment and detachment.

2. Background of the Invention

In general, a vacuum contactor is a high voltage electric device used for controlling opening and closing and protection to supply or stop AC power supplied to a motor, a transformer, a condenser bank, various switching systems, and the like.

In a power fuse combination vacuum contactor, among vacuum contactors, when a fault current is generated in a circuit, the fuse blows to break the circuit to protect a load device and the circuit.

FIG. 1 is a perspective view of a main body of a vacuum contactor according to a related art, and FIG. 2 is a perspective view of the main body and a cradle of the vacuum contactor according to a related art.

As illustrated in FIG. 1, a main body of the power fuse combination vacuum contactor includes a truck 1, a main circuit part 2 installed in an upper part of the truck 1, and a front cover 3 installed on a front side of the main circuit part 2. The main circuit part 2 has three phases, and each of the phases includes an upper terminal 4 and a lower terminal 5. A fuse is provided in each of the phases above the main circuit part 2. The fuse is connected to the upper terminal 4, and when a fault current is generated in a circuit, the fuse 6 blows to protect the circuit. The fuse 6 is installed in a fuse case 7. The fuse case 7 generally has a box shape with an open upper side to allow the fuse 6 to be installed therein.

Operations of the components are as follows. Power applied through the upper terminal 4 to which a power source side terminal is connected is transferred to a load side terminal connected to the lower terminal 5 through the fuse 6 and a vacuum interrupter (VI) (not shown) (which is installed within the main circuit part). When an abnormal current is generated during actuation of the circuit, the fuse 6 blows to break the circuit and the fuse case 7 prevents flash over of an abnormal transient voltage which has not been resolved. Thus, the fuse case 7 restrains flash over due to a high charge voltage of each of the phases (R phase and S phase and S phase and T phase) to prevent an inter-phase short accident, and prevents dielectric breakdown due to an introduction of a foreign object between phases.

FIG. 2 illustrates a state in which the main body of the vacuum contactor is inserted in a cradle 8. When the main body of the vacuum contactor is drawn in, the fuse case 7 is partially inserted into a terminal bushing 9 of the cradle. Thus, a side of the fuse 6 is completely insulated. Here, since an upper side of the fuse case 7 is open, if the fuse 6 is long, a front end portion is covered by the front cover 3 and a rear end portion is positioned within the terminal bushing 9, and thus, insulating performance is guaranteed. However, if the fuse 6 is short, a rear end portion (terminal part adjacent to the cradle) of the fuse 6 is exposed outwardly, leading to a possibility that dielectric breakdown occurs with a shutter 8a of the cradle 8.

SUMMARY OF THE INVENTION

Therefore, an aspect of the detailed description is to provide a fuse case and a case cover of a vacuum contactor in which a case cover is provided in a terminal part of a fuse case adjacent to a cradle to prevent dielectric breakdown, and a protrusion type locking device structure is applied to facilitate detachment and attachment.

To achieve these and other advantages and in accordance with the purpose of this specification, as embodied and broadly described herein, a fuse case and a case cover, which are detachable and applied to a vacuum contactor including a truck, a main circuit unit, and a front cover covering a front side of the main circuit unit, may include: a fuse connected to an upper terminal of the main circuit unit and blowing, when a fault current is generated in a circuit, to break the circuit; a fuse case opened in an upper side, accommodating the fuse, and having an insertion coupling part formed on a side surface thereof; and a case cover coupled to an upper side of the fuse case, coupled to the insertion coupling part in an insertion-coupling manner, and covering a rear end portion of the fuse, wherein the case cover includes an upper surface portion and side surface portions, and the side surface portions include a first side surface portion formed on a front side and a second side surface portion formed on a rear side.

The upper surface portion may include a first upper surface portion formed on a front side, a second upper surface portion formed in a position lower than the first upper surface portion on a rear side, and a connection portion formed between the first upper surface portion and the second upper surface portion.

The first and second side surface portions may be formed as dual walls and have a first rail recess and a second rail recess, respectively.

A plurality of first ribs may be formed between inner surfaces of the first and second side surface portions and inner surfaces of the first and second upper surface portions.

A coupling wing part may be provided vertically in lower portions of both sides of the upper surface portion and coupled to the insertion coupling part.

A plurality of second ribs may be formed between the coupling wing part and the connection portion to enhance bearing capacity.

A coupling portion may be provided in the coupling wing part and insertion-coupled to the insertion coupling part.

The coupling portion may be provided as a hemispherical protrusion.

In the fuse case and the case cover of the vacuum contactor according to an embodiment of the present disclosure, since the case cover is provided in the terminal portion adjacent to the cradle of the fuse case, dielectric breakdown between a conductor portion of the cradle and the fuse may be prevented.

Also, since the fuse case and the case cover are configured in an insertion coupling manner by a protrusion and a recess, attachment and detachment are facilitated.

In addition, the side wall of the case cover is formed as a dual wall and stably inserted into the side surface of the fuse case, without causing shaking or movement.

Moreover, since the case cover is provided only in the terminal portion adjacent to the cradle, manufacturing cost may be reduced and an attachment and detachment operation during repairing is facilitated.

Further scope of applicability of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Figure 1:
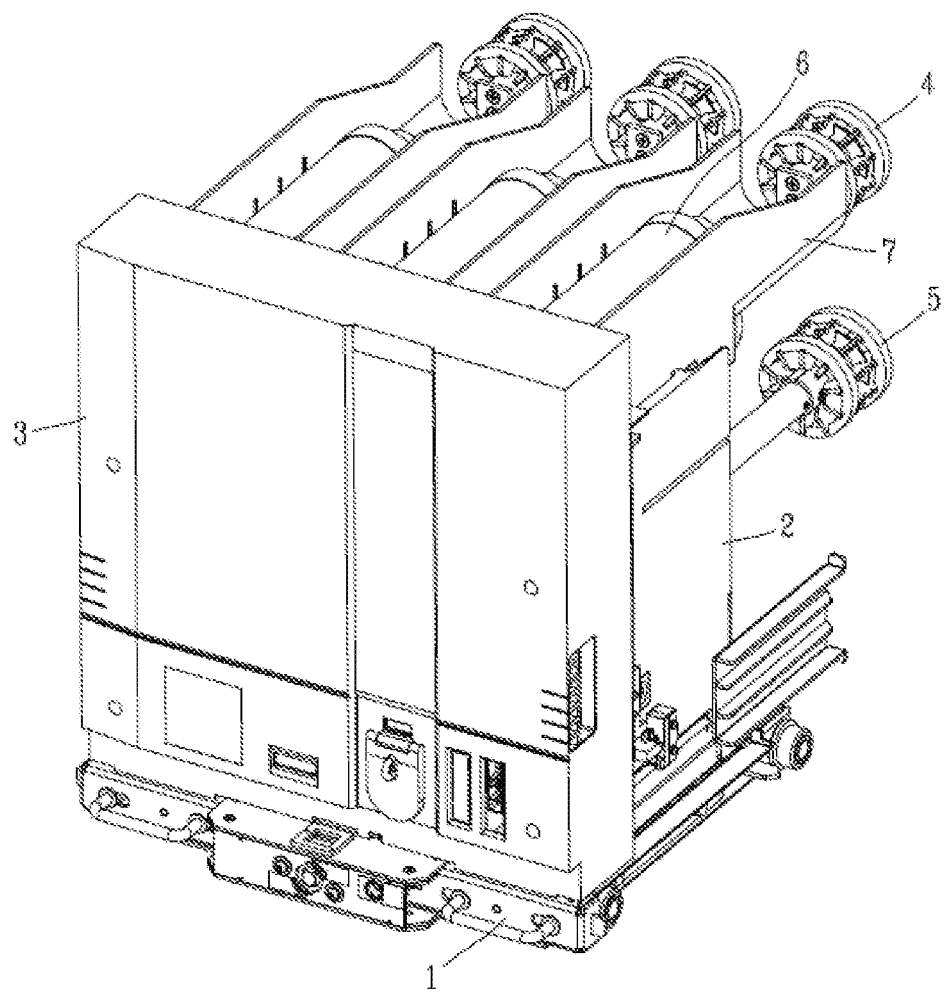
FIG. 1 is a perspective view of a main body of a vacuum contactor according to the related art.
Figure 2:
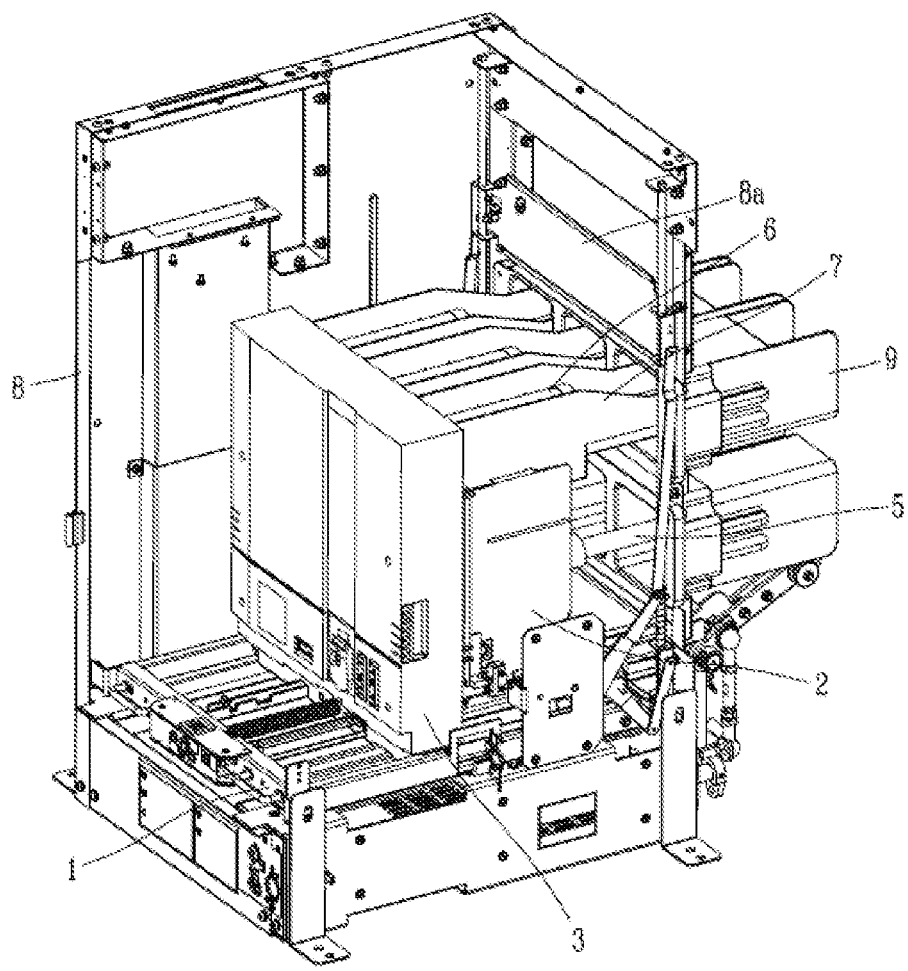
FIG. 2 is a perspective view of the main body and a cradle of the vacuum contactor according to the related art.
Figure 3:
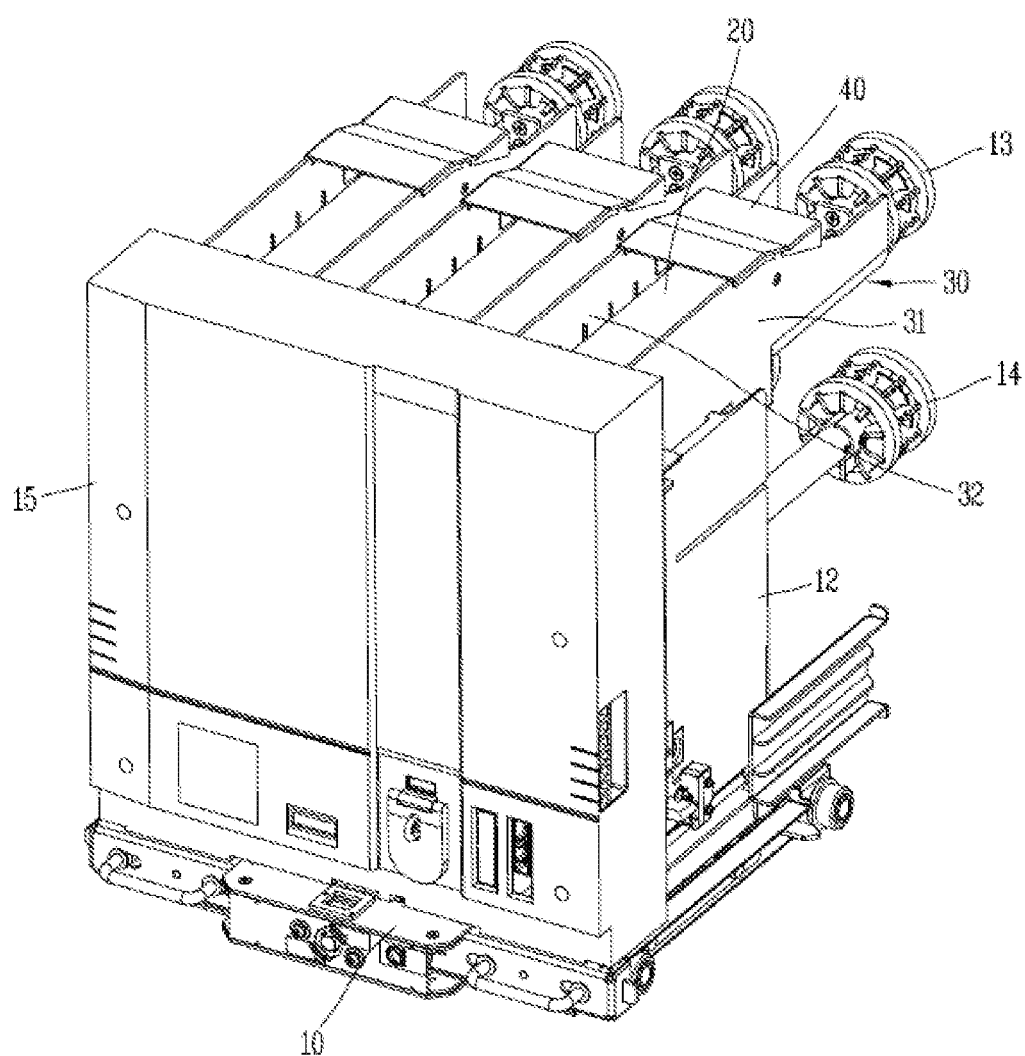
FIG. 3 is a perspective view of a main body of a vacuum contactor according to an embodiment of the present disclosure.
Figure 4:
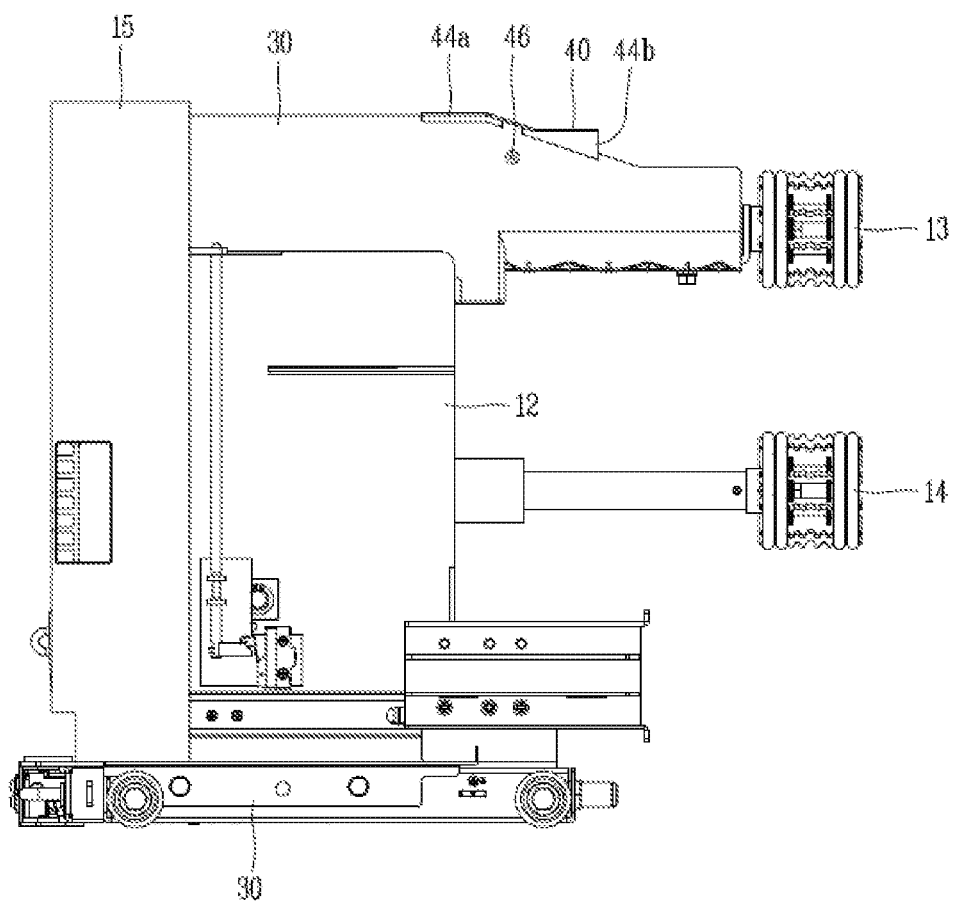
FIG. 4 is a side view of FIG. 3.
Figure 5:
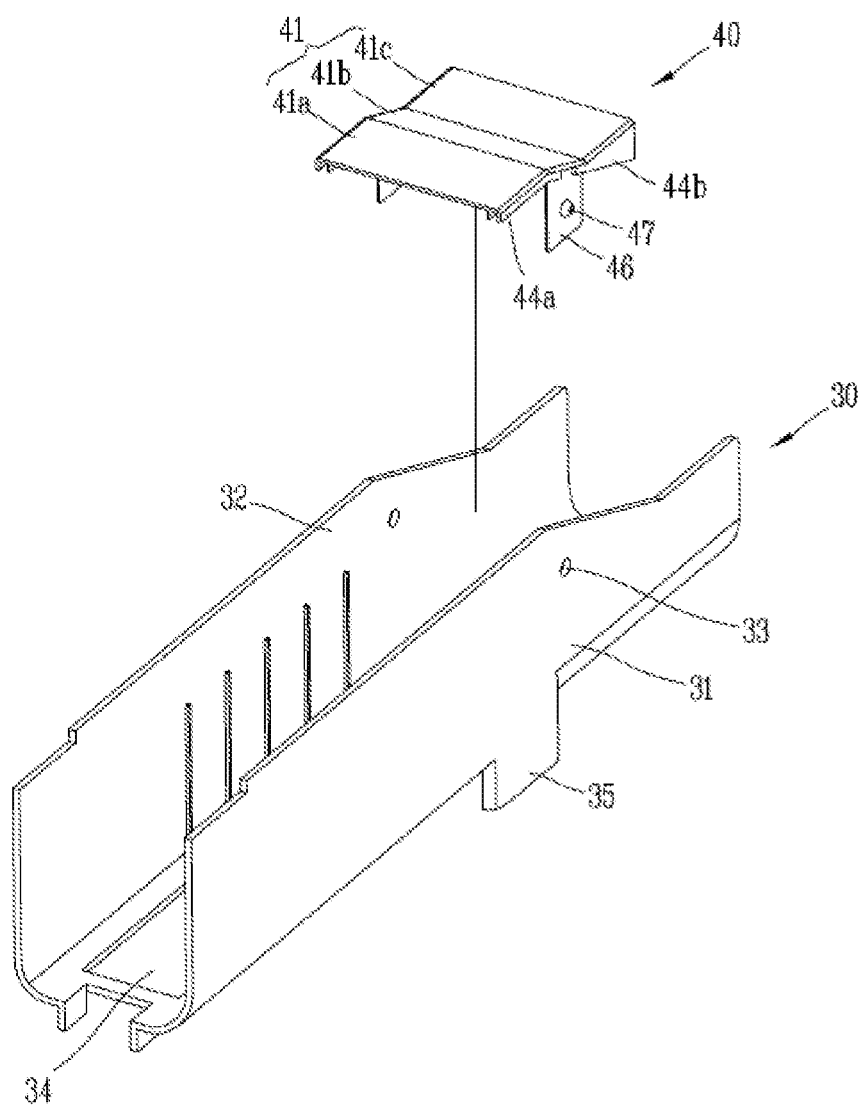
FIG. 5 is a perspective view of a fuse case and a case cover of a vacuum contactor according to an embodiment of the present disclosure.
Figure 6:
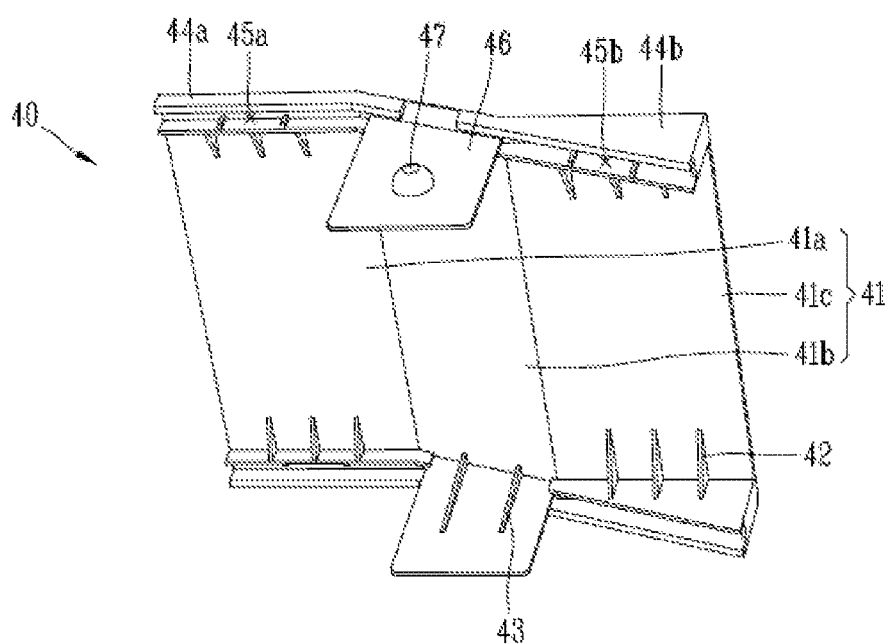
FIG. 6 is a lower perspective view of a cover of a vacuum contactor according to an embodiment of the present disclosure.
Figure 7:
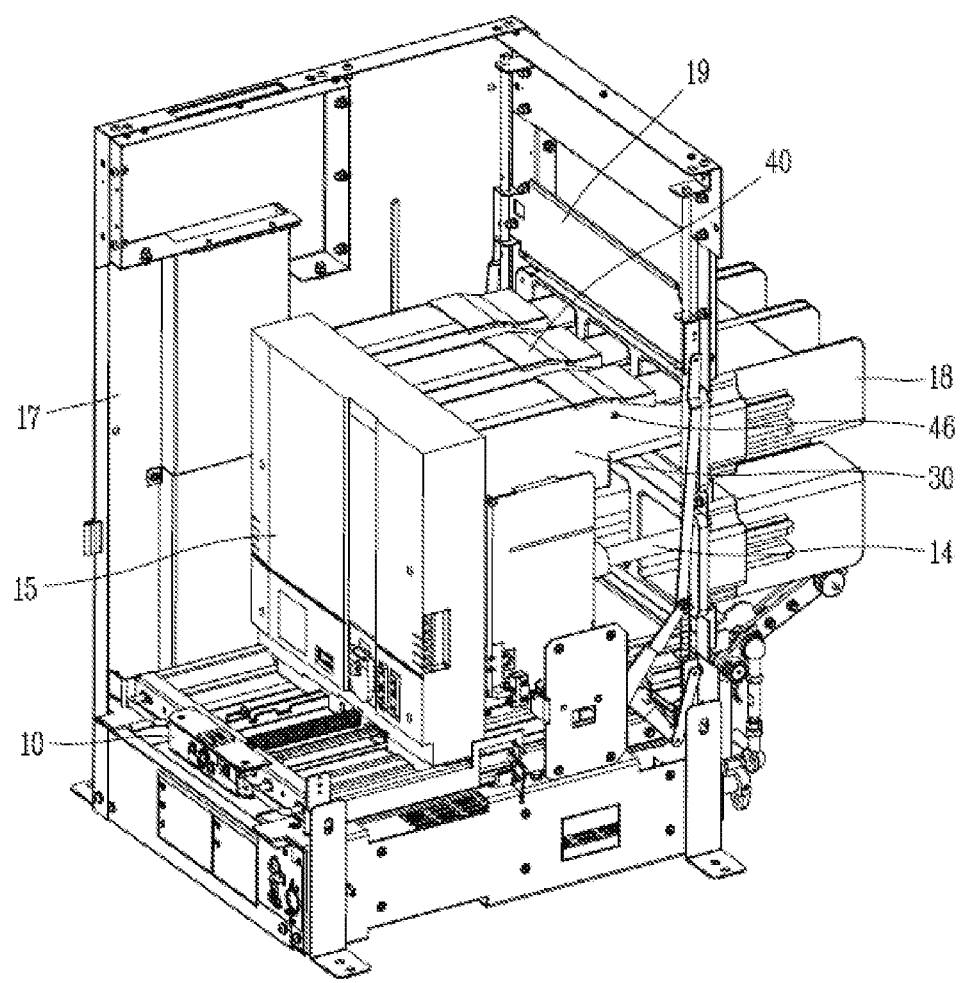
FIG. 7 is a perspective view of a main body and a cradle of a vacuum contactor according to an embodiment of the present disclosure.

FIGS. 3 and 4 are a perspective view and a side view of a main body of a vacuum contactor according to an embodiment of the present disclosure. FIG. 5 FIG. 5 is a perspective view of a fuse case and a case cover of a vacuum contactor according to an embodiment of the present disclosure. FIG. 6 is a lower perspective view of a cover of a vacuum contactor according to an embodiment of the present disclosure. FIG. 7 is a perspective view of a main body and a cradle of a vacuum contactor according to an embodiment of the present disclosure.

A fuse case and a case cover of a vacuum contactor according to an embodiment of the present disclosure will be described with reference to the accompanying drawings.

The fuse case and the case cover applied to a vacuum contactor including a truck 10, a main circuit part 12, and a front cover 15 covering a front side of the main circuit part 12, according to an embodiment of the present disclosure includes a fuse 20 blown when a fault current is generated in a circuit to break the circuit; a fuse case 30 having open upper portion, accommodating the fuse 20, and having an insertion coupling part 33 formed on a side surface thereof; and a case cover 40 coupled to an upper portion of the fuse case 30 and coupled to the insertion coupling part 33 in an insertion-fitting manner.

A main body of the vacuum contactor is illustrated in FIG. 3. The main body may include a truck 10, a main circuit part 12, and a front cover 15.

The truck 10, a transfer device, is installed below the main body and transfers the main body. The main body may be drawn in and out in the cradle 17 by the truck 10 (please refer to FIG. 7).

The main circuit part 12 may be provided to break a portion of the circuit. A vacuum interrupter VI may be installed in the main circuit part 12. The vacuum interrupter VI may have a fixed contact and a movable contact, and when a fault current is generated in the circuit, the movable contact is separated from the fixed contact to break the circuit. The main circuit part 12 has an upper terminal 13 and a lower terminal 14 connected to a power source and a load device, respectively.

The front cover 15 is installed in front of the main circuit part 12. The front cover 15 may protect the main circuit part 12, an operating mechanism, and the like, within the main body, and various displays and operating units may be provided on the front cover 15 to allow for internal monitoring.

The fuse 20 is installed above the main circuit unit 12. The fuse 20 is installed within the fuse case 30 and fixed to a fuse holder (not shown). A rear end portion (a terminal portion adjacent to the cradle) of the fuse 20 is connected to a power source unit through the upper terminal 13, and a front end portion (a terminal portion adjacent to the main circuit part) of the fuse 20 is connected to the vacuum interrupter VI within the main circuit part 12 through a connection conductor. When a fault current is generated in the circuit, the fuse 20 blows to prevent a inter-phase dielectric breakdown or a short-circuit accident.

The main circuit part 12 including the vacuum interrupter VI serves to manually or automatically break the circuit in case of testing or a fault current is generated. A general configuration of operation thereof is widely known, and thus, a detailed description thereof will be omitted.

The fuse case 30 is provided to cover the fuse 20, increase dielectric strength, and protect each phase and a load device from a flash over due to a fault current, or the like.

The fuse case 30 has a box shape with an open upper portion. Both sides 31 and 32 of the fuse case 30 serve as partitions for maintaining inter-phase insulation performance. That is, since the insulation walls are provided between phases and on both side walls, a creeping distance is increased to increase insulation performance and prevent foreign objects from being mixed.

The insertion coupling part 33 is provided on both side surfaces 31 and 32 of the fuse case 30. The insertion coupling part 33 is provided to allow for coupling in an insertion-coupling manner. For example, the insertion coupling part 33 formed alone is illustrated in FIG. 5. Here, the insertion coupling part 33 may be formed in a portion where a rear end portion of the fuse 20 is present.

An opening 34 allowing for insertion of a fuse holder (not shown) may be formed in a lower surface of the fuse case 30. Here, the opening 34 may be formed in plurality. A lower partition part 35 may protrude from a lower portion of the fuse case 30. As an insulation wall is formed between the upper terminal 13 and the vacuum interruptor VI by the lower partition part 35, insulation properties may be enhanced and introduction of a foreign object may be prevented.

The case cover 40 is provided to open or close an upper side of the fuse case 30 as necessary. The case cover 40 may include an upper surface portion 41 and side surface portions 44a and 44b.

The upper surface portion 41 may include a sloped surface or a bent surface formed in a length direction. The upper surface portion 41 may be deformed according to a shape of the fuse case 30. The upper surface portion 41 may include a first upper surface portion 41a formed on a front side, a second upper surface portion 41c formed in a position lower than the first upper surface portion on a rear side, and a connection portion 41b formed between the first upper surface portion 41a and the second upper surface portion 41c. Here, the first upper surface portion 41a and the second upper surface portion 41c are formed as planes parallel to a ground, and the connection portion 41b may be formed as a sloped surface. Since the first upper surface portion 41a is formed in a position higher than the second upper surface portion 41c, the first upper surface portion 41a may have a height sufficient to secure inter-phase insulating capabilities, and when the main body is drawn in, a portion of the case cover 40 may be inserted into the terminal bushing 18. A width of the upper surface portion 41 may correspond to a width of the fuse case 30.

The side surface portions 44a and 44b are formed on both sides of the upper surface portion 41. The side surface portions 44a and 44b may include a first side surface portion 44a and a second side surface portion 44b. Here, the first side surface portion 44a may be formed on a front side, and the second side surface portion 44b may be formed on a rear side. The first side surface portion 44a may be connected to the first upper surface portion 41a and the connection portion 41b. The second side surface portion 44b may be connected to the second upper surface portion 41c and the connection portion 41b. The first side surface portion 44a and the second side surface portion 44b my be formed as dual walls. Thus, a first rail recess 45a and second rail recess 45b are formed on the first side surface portion 44 and the second side surface portion 44b, respectively. Upper portions of the both side surfaces 31 and 32 of the fuse case 30 are inserted into the first rail recess 45a and the second rail recess 45b. Since the first side surface portion 44a and the second side surface portion 44b are formed as dual walls and inserted into the both side surfaces 31 and 32 of the fuse case 30, the case cover 40 may be maintained in a state of being stably coupled to the fuse case 30, without being horizontally shaken or moved. A plurality of first ribs 42 may be formed between an inner side surface of the first side surface portion 44a and the first upper surface portion 41a and between an inner side surface of the second side surface portion 44b and an inner side surface of the second upper surface portion 41c. Thus, bearing capacity may be enhanced.

A coupling wing part 46 is vertically provided in lower portions of both sides of the upper surface portion 41. The coupling wing part 46 may be formed between the first side surface portion 44a and the second side surface portion 44b. The coupling wing part 46 may extend downwardly than the first side surface portion 44a and the second side surface portion 44b. A plurality of ribs 43 are formed between the coupling wing part 46 and the connection portion 41b to enhance bearing capacity.

A coupling portion 47 corresponding to the insertion coupling part 33 is provided in the coupling wing part 46. The coupling portion 47 may be formed as a protrusion. Here, the coupling portion 47 may be formed as a hemispherical protrusion. Thus, as the coupling portion 47 is inserted into the insertion coupling part 33, the case cover 40 may be fixed to the fuse case 30. Here, the insertion coupling part 33 and the coupling portion 47 may be formed in a portion where a rear end portion of the fuse 20 is positioned. Thus, the case cover 40 may cover the rear end portion of the fuse 20 and prevent a dielectric breakdown phenomenon that may occur between the rear end portion of the fuse 20 and the cradle 17, specifically a shutter 19 of the cradle 17.

An operation of the fuse case and the case cover of the vacuum contactor according to an embodiment of the present disclosure will be described with reference to FIGS. 5 to 7.

The main body of the vacuum contactor is drawn to a connect position within the cradle 17 by the truck 10. When the main body of the vacuum contactor is drawn in, the fuse case 30 is partially inserted into the terminal bushing 18 of the cradle 17. Here, a portion of the second upper surface portion 41c may be inserted into the terminal bushing 18. Thus, the side surface of the fuse is completely insulated. Also, even when a length of the ruse 20 is short, a rear end portion (terminal portion adjacent to the cradle) of the fuse 20 is covered by the case cover 40, the rear end portion of the fuse 20 is not exposed outwardly, preventing dielectric breakdown between the fuse 20 and the cradle 17.

Meanwhile, the case cover 40 is formed to have a length covering only the rear end portion of the fuse 20, so that when the main body is drawn out, a front end portion and a rear end portion of the case cover 40 are exposed, facilitating an attachment or detachment operation. Also, since the coupling portion 47 is formed as a hemispherical protrusion and the insertion coupling part 33 is formed alone, guaranteeing facilitation of the attachment or detachment operation. A worker may perform the attachment or detachment operation through a simple manual operation of pulling up or pushing down the case cover 40 from the fuse case 30

According to the fuse case and the case cover of the vacuum contactor, since the case cover is provided in the terminal portion adjacent to the cradle of the fuse case, dielectric breakdown between a conductor portion of the cradle and the fuse may be prevented.

Also, since the fuse case and the case cover are configured in an insertion coupling manner by a protrusion and a recess, attachment and detachment are facilitated.

In addition, the side wall of the case cover is formed as a dual wall and stably inserted into the side surface of the fuse case, without causing shaking or movement.

Moreover, since the case cover is provided only in the terminal portion adjacent to the cradle, manufacturing cost may be reduced and an attachment and detachment operation during repairing is facilitated.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A fuse case and a case cover, which are detachable and applied to a vacuum contactor including a truck, a main circuit unit, and a front cover covering a front side of the main circuit unit, the fuse case and the case cover comprising:
   a fuse connected to an upper terminal of the main circuit unit and blowing, when a fault current is generated in a circuit, to break the circuit;
   the fuse case opened in an upper side, accommodating the fuse, and having an insertion coupling part formed on a side surface thereof; and
   the case cover coupled to the upper side of the fuse case, coupled to the insertion coupling part in an insertion-coupling manner, and covering a rear end portion of the fuse,
   wherein the case cover includes an upper surface portion and side surface portions, and the side surface portions include a first side surface portion formed on a front side and a second side surface portion formed on a rear side,
   wherein the first and second side surface portions are formed as dual walls and have a first rail recess and a second rail recess, respectively, and
   wherein the side surface of the fuse case is inserted into the first rail recess and the second rail recess.

2. The fuse case and the case cover of claim 1, wherein the upper surface portion includes a first upper surface portion formed on a front side, a second upper surface portion formed in a position lower than the first upper surface portion on a rear side, and a connection portion formed between the first upper surface portion and the second upper surface portion.

3. The fuse case and the case cover of claim 2, wherein a plurality of first ribs are formed between inner surfaces of the first and second side surface portions and inner surfaces of the first and second upper surface portions.

4. The fuse case and the case cover of claim 2, wherein a coupling wing part is provided vertically in lower portions of both sides of the upper surface portion and coupled to the insertion coupling part.

5. The fuse case and the case cover of claim 4, wherein a plurality of second ribs are formed between the coupling wing part and the connection portion to enhance bearing capacity.

6. The fuse case and the case cover of claim 4, wherein a coupling portion is provided in the coupling wing part and insertion-coupled to the insertion coupling part.

7. The fuse case and the case cover of claim 6, wherein the coupling portion is provided as a hemispherical protrusion.

* * * * *